United States Patent
Coudray et al.

(10) Patent No.: US 8,418,529 B2
(45) Date of Patent: Apr. 16, 2013

(54) DEVICE FOR CONVEYING A SUBSTANCE PROVIDED WITH AN OPTICAL LEAK DETECTOR

(75) Inventors: Paul Coudray, Saint Jean de Cuculle (FR); Jean-Pascal Biaggi, La Celle Saint Cloud (FR)

(73) Assignee: Genesis France, Courbevoie (FR)

( * ) Notice: Subject to any disclaimer, the term of this patent is extended or adjusted under 35 U.S.C. 154(b) by 387 days.

(21) Appl. No.: 12/444,459

(22) PCT Filed: Oct. 10, 2007

(86) PCT No.: PCT/FR2007/001654
§ 371 (c)(1),
(2), (4) Date: May 18, 2009

(87) PCT Pub. No.: WO2008/043915
PCT Pub. Date: Apr. 17, 2008

(65) Prior Publication Data
US 2010/0005860 A1    Jan. 14, 2010

(30) Foreign Application Priority Data
Oct. 10, 2006 (FR) .................... 06 08880

(51) Int. Cl.
*G01M 3/28* (2006.01)
*G01M 3/38* (2006.01)
(52) U.S. Cl.
USPC ........................................ 73/40.5 R
(58) Field of Classification Search ........... 73/40.5 R
See application file for complete search history.

(56) References Cited

U.S. PATENT DOCUMENTS

| | | | |
|---|---|---|---|
| 4,450,711 A | 5/1984 | Claude | |
| 5,067,815 A * | 11/1991 | Kotrotsios et al. | 356/479 |
| 6,032,699 A * | 3/2000 | Cochran et al. | 138/104 |
| 2002/0007861 A1* | 1/2002 | Hansen et al. | 138/143 |
| 2002/0041724 A1* | 4/2002 | Ronnekleiv et al. | 385/12 |
| 2003/0052256 A1 | 3/2003 | Spirin et al. | |
| 2004/0067003 A1* | 4/2004 | Chliaguine et al. | 385/13 |
| 2004/0173004 A1* | 9/2004 | Eblen et al. | 73/31.05 |

FOREIGN PATENT DOCUMENTS

| | | |
|---|---|---|
| EP | 0 053 546 A | 6/1982 |
| EP | 0 780 623 A | 6/1997 |
| EP | 1 300 704 | 4/2003 |
| EP | 1 441 018 | 7/2004 |
| WO | WO 02/082036 A | 10/2002 |

OTHER PUBLICATIONS

International Search Report dated Apr. 28, 2008, issued in corresponding international application No. PCT/FR2007/001654.
Written Opinion of the International Searching Authority dated Apr. 28, 2008, issued in corresponding international application No. PCT/FR2007/001654.

* cited by examiner

*Primary Examiner* — Hezrone E. Williams
*Assistant Examiner* — Gregory J Redmann
(74) *Attorney, Agent, or Firm* — Ostrolenk Faber LLP

(57) ABSTRACT

A device for conveying a substance that comprises: a first duct for containing the substance; an optical fiber connected to the first duct and extending along the duct, the optical fiber including several detection members spaced along its length, each detection member having a separate reflection spectrum that varies with the presence of the substance to be detected; a control device including a light source capable of emitting a light in the reflection spectrum of each detection member, a light receiver capable of detecting the light amplitude in the detection spectrum of each detection member, and an analysis module capable of determining the presence of a leak of the substance based on the light amplitude provided by the light receiver.

13 Claims, 2 Drawing Sheets

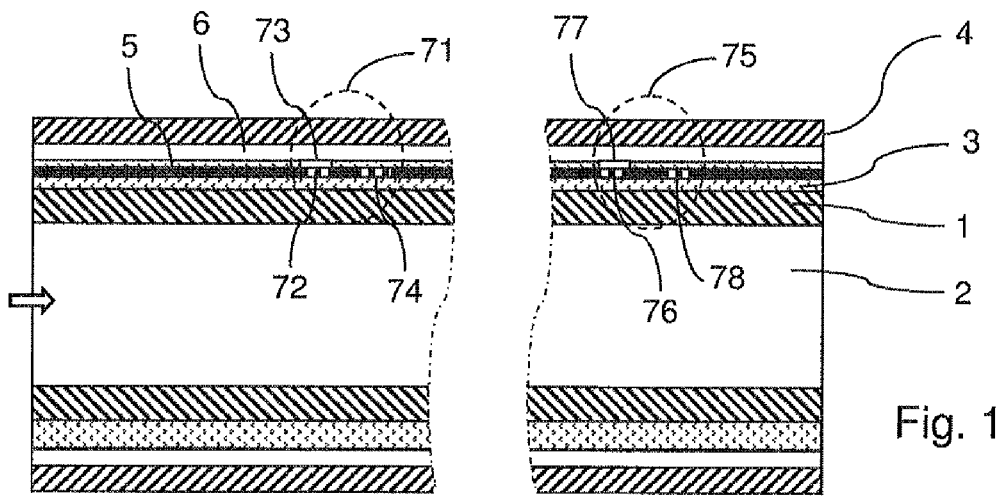
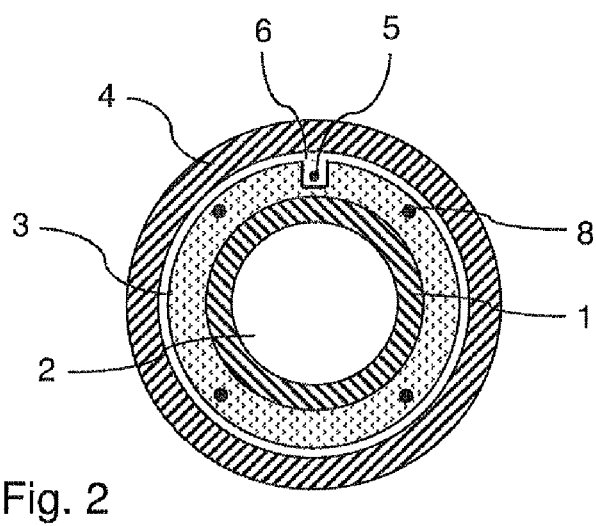
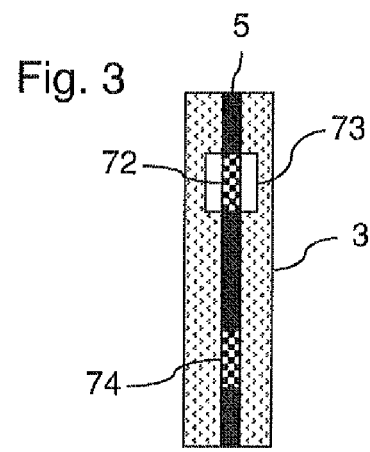
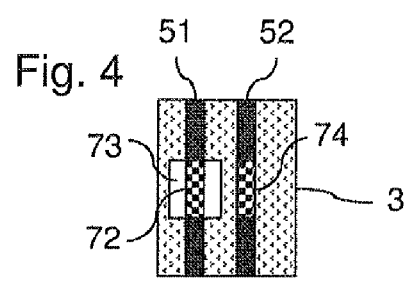
Fig. 1
Fig. 2
Fig. 3
Fig. 4

# DEVICE FOR CONVEYING A SUBSTANCE PROVIDED WITH AN OPTICAL LEAK DETECTOR

CROSS REFERENCE TO RELATED APPLICATION

The present application is a 35 U.S.C. §§371 national phase conversion of PCT/FR2007/001654, filed Oct. 10, 2007, which claims priority of French Application No. 0608880, filed Oct. 10, 2006, the disclosure of which is incorporated by reference herein. The PCT International Application was published in the French language.

BACKGROUND OF THE INVENTION

The invention relates to devices for transporting substances, and in particular the leak detection devices in a gas or liquid transport pipe.

A known gas pipe is provided with temperature sensors distributed along its length and arranged outside the pipe. Since the temperature of the gas inside the pipe is of the order of −160° C., when a temperature sensor undergoes a sudden drop in temperature, the existence of a leak nearby in the pipe is determined.

This pipe has the drawback of not detecting or correctly locating small leaks or leaks that have a complicated path. In such cases, the temperature variation at the level of the sensors can prove inadequate for detecting the leak.

Furthermore, given the current development of gas transport networks, there is a need for pipes that offer increased safety control. There is in particular a need for detecting any gas leak or any suspect variation in the temperature along the pipe. These control means must make it possible to monitor leaks in a pipe that can be as long as several kilometers. There is also a need for locating leaks, which is particularly advantageous for intervening on pipes of long lengths.

SUMMARY OF THE INVENTION

The invention aims to resolve one or more of these drawbacks. The invention also relates to a device for transporting a substance, comprising:
a first pipe for containing the substance;
an optical fiber connected to the first pipe and extending along said pipe, the optical fiber including several detection members spaced along its length, each detection member having a separate reflection spectrum that varies with the presence of the substance to be detected;
a control device including a light source capable of emitting a light in the reflection spectrum of each detection member, a light receiver capable of detecting the light amplitude in the reflection spectrum of each detection member, and an analysis module capable of determining the presence of a leak of the substance based on the light amplitude provided by the light receiver.
According to a variant, the device comprises:
a passage communicating with the various detection members;
a pumping device able to generate a flow of gas in the passage.
According to another variant, the device comprises:
a thermal insulation sheath coating the first pipe and passed through by the optical fiber;
a second pipe surrounding the insulation sheath, forming with the sheath the passage, communicating with the detection members;
a pumping device able to cause a flow of inert gas to circulate in the passage.

According to another variant, the device comprises at least one temperature sensor associated with a detection member positioned roughly at the same level on the axis of the first pipe, the temperature sensor being connected to the control device, the control device being able to determine the presence of the substance at the level of a detection member by taking into account the temperature measured by its associated sensor.

According to yet another variant, the device comprises:
another optical fiber connected to the first pipe and extending along the first pipe;
a device injecting a light into this other optical fiber and determining the temperature according to the variation of the properties of this other fiber in response to the injected light.

According to a variant, the detection members comprise a Bragg grating encompassed in a material absorbing a specific gas to be detected.

According to yet another variant, said material encompassing the Bragg grating absorbs methane.

According to another variant, the analysis module is able to determine the presence of a leak of the substance according to the shift in wavelength of a light whose amplitude is provided by the light receiver.

The invention also relates to a method of detecting a leak from a pipe transporting a substance, comprising the following steps:
injecting, by successive pulses, a light into an optical fiber extending along the pipe and including several detection members spaced along its length, each detection member having a distinct reflection spectrum varying with the presence of a substance to be detected, the successive light pulses covering the reflection spectrum of each detection member;
detecting the light amplitude in the reflection spectrum of each detection member;
determining the presence of a leak of the substance to be detected according to the detected light amplitude.

According to a variant, the step for determining the presence of a leak of the substance depends on the detection of a shift in the wavelength of the detected light.

Other features and benefits of the invention will become clearly apparent from the description given hereinbelow, by way of indication and by no means limiting, with reference to the appended drawings in which:

BRIEF DESCRIPTION OF THE DRAWINGS

FIG. 1 illustrates a cross-sectional view of a pipe according to the invention along its axis;
FIG. 2 illustrates a cross-sectional view of the pipe of FIG. 1, perpendicularly to its axis;
FIG. 3 illustrates a cross-sectional view of a first variant of a detection member, used with the pipe of FIGS. 1 and 2;
FIG. 4 illustrates a cross-sectional view of a second variant of a detection member.

DESCRIPTION OF A PREFERRED EMBODIMENT

Figure 5:
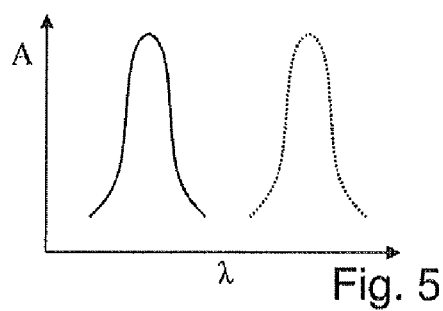
FIGS. 5 to 8 illustrate various fiber input or output diagrams, making it possible to determine the presence of a leak in the pipe.

FIGS. 1 and 2 illustrate an exemplary device for transporting gas to which the invention is applied. This device comprises a first pipe 1 forming an internal volume 2 for containing the gas and allowing it to flow. The first pipe can be a rigid pipe and be made of a material such as Invar. The first pipe 1 is clad in a thermal insulation sheath 3, made of a synthetic material such as that marketed under the name Aerogel. Since the gas, such as liquid methane, often circulates at temperatures of the order of −165° C., such an insulation sheath 3 between the first pipe 1 and the environment can prove necessary. The sheath 3 is surrounded by a second pipe 4. This pipe 4 can be formed using a material such as carbon steel or stainless steel. Such a pipe 4 is used in particular if standards dictate a double containment structure.

An optical fiber 5 is connected to the first pipe 1 and extends along this pipe. The optical fiber 5 includes the leak detection members spaced along its length, including the detection members 71 and 75.

The detection members 71 and 75 are of discrete type and respectively have parts that are optically sensitive to the gas to be detected 72 and 76, and reference optical parts 74 and 78 in the axis of the optical fiber 5. Passages 73 and 77 are provided in the sheath 3 to allow a gaseous contact respectively between the sensitive parts 72 and 76 and an ambient gas. The reference parts 74 and 78 are, on the contrary, insulated or insensitive to the ambient gas. FIG. 3 more specifically illustrates the detection member 71. The sensitive part 72 is thus placed in contact with the ambient gas and its optical properties will vary with the proportion of the gas to which it is sensitive, in this ambient gas. The reference part 74 is made optically insensitive to this gas, either by not using a material sensitive to this gas, or by being insulated from the ambient gas. The reference part 74 thus makes it possible to determine the shift of the optical properties of the sensitive part 72. The use of the reference part 74 also makes it possible to more easily determine a problem affecting the structure of the optical fiber or its light source. The detection members 71 and 75 can be made in the form of integrated optical components, whose optically sensitive and optically insensitive parts are made using a material having a refraction index approaching that of the optical fiber. Although a part optically sensitive to the gas has been described, it is also possible to provide a part sensitive to contact from a given fluid.

As illustrated in FIGS. 1 and 2, the transport device advantageously has a passage 6 communicating with the sensitive parts of the various detection members. A pumping device can be used to generate a flow of gas in the passage 6. It is possible to force a flow of inert gas such as argon or nitrogen. Such a flow of gas makes it possible to dynamically follow the trend of a leak. By evacuating the gas that could stagnate at the level of the sensitive part of a detection member. In order to maintain the dimensions of the passage 6 between the sheath 3 and the second pipe 4, the device 1 can be provided over its length with rigid rings enabling the second pipe 4 to bear on the first pipe 1.

Instead of an integrated optical component, the leak detection members can be made from the optical fiber 5 whose continuity is retained. For this, it is possible to consider locally removing the sheath surrounding the core of the optical fiber 5, then covering the uncovered part with a material sensitive to the gas to be detected.

The use of an optical fiber for detecting leaks along a gas pipe offers the following advantages: an insensitivity to electromagnetic interference, an immunity in environments with high electrical voltage, strong noise or extreme temperatures, a distributed measurement capability, an absolute measurement, a large measurement range and resolution, a very high information transmission speed, a very great transmission capability, reduced weight and volume, operation that does not require electrical power supply at the level of the sensors, chemical passivity, reduced cost compared to electrical sensors and low propagation losses.

FIG. 4 illustrates another variant of the geometry of a detection member. In this example, two portions of optical fibers 51 and 52 extend in parallel. The fiber portion 51 will include in its continuity the optically sensitive part 72 arranged in the passage 73, whereas the fiber portion 52 will have in its continuity the reference part 74.

A control device that is not illustrated serves as a light source for the fiber 5, measures the light reflected or transmitted by the fiber 5, and determines the presence of a leak of the gas sought according to the variations of the optical properties of a detection member. To interrogate the various detection members having distinctive wavelengths, the control device will advantageously use wavelength division multiplexing (WDM). Thus, the gas leak cannot only be detected very quickly, but its precise location can also be obtained within the same time frame.

In a first variant, the control device comprises an emitter with a wideband source and has a receiver with selective wavelength. The wavelength of the receiver is adapted consecutively for each detection member that is to be interrogated.

In a second variant, the control device consecutively emits pulses having different wavelengths from a wavelength-tunable light source. The control device then advantageously has a wideband receiver.

FIGS. 5 to 8 illustrate reflection and transmission diagrams that can be used to determine the presence of a gas leak, when a wide spectrum light is injected into the optical fiber.

Figure 6:
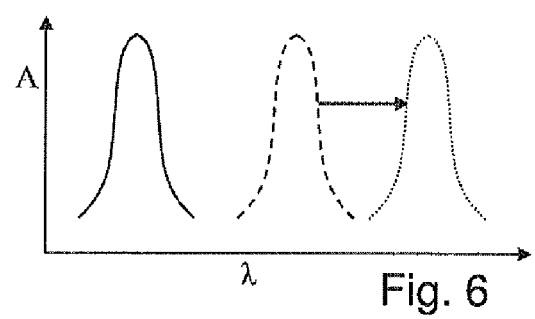
Figure 7:
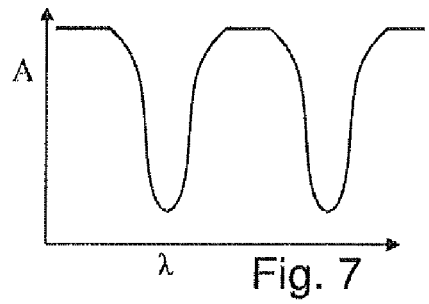
Figure 8:
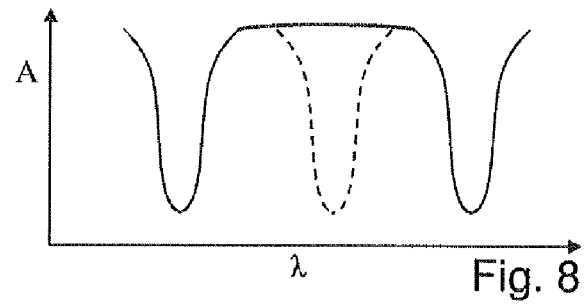

FIGS. 5 and 6 illustrate the intensity of reflected light according to its wavelength. FIGS. 7 and 8 illustrate the intensity of transmitted light according to its wavelength.

FIG. 5 corresponds to an absence of the gas to be detected in the ambient gas. FIG. 5 shows on the left a ray corresponding to the reflection from a reference Bragg grating and on the right a ray corresponding to the reflection of a Bragg grating that is optically sensitive to the gas to be detected. It will be observed in FIG. 6 that, in the presence of the gas to be detected, the sensitive Bragg grating has undergone a shift in its reflection wavelength.

FIGS. 7 and 8 illustrate this same shift in wavelength of the sensitive Bragg grating, seen from the side of the spectrum transmitted by the fiber.

The wavelength responses of the Bragg gratings belonging to different detection members will be configured not to overlap even when there is a shift in wavelength induced by a temperature variation: each sensor thus remains uniquely and unambiguously identifiable. The reflection wavelengths of the various detection members can be spaced apart by 20 to 25 nanometers.

For a pipe 2500 meters long, it is possible to consider having detection members every 50 meters. For pipes longer than 2500 meters, it is possible to consider a similar distribution of the detection members and position optical amplifiers every 2500 meters. For long pipe lengths, optical amplifiers can be incorporated at intermediate positions on the optical fiber. EDFA (erbium-doped fiber amplifiers) are a particularly suitable solution for keeping the electrical power supply far enough away from the pipe.

For a pipe 2500 meters long, it is possible to consider having detection members very 50 meters. For pipes longer than 2500 meters, it is possible to consider a similar distribution of the detection members and position optical amplifiers every 2500 meters. For long pipe lengths, optical amplifiers can be incorporated at intermediate positions on the optical fiber. EDFA (erbium-doped fiber amplifiers) are a particularly suitable solution for keeping the electrical power supply far enough away from the pipe.

For large sized pipes, a particularly advantageous manufacturing mode can be envisaged. It is possible to envisage joining sections of standard lengths together, in order to reduce the manufacturing cost of a pipe and be able to easily adjust its length. Each section can, for example, have a length of 12 or 24 meters for example.

For this, it is possible to start from a first pipe of the desired standard length. On this pipe, a first layer of Aerogel can be molded. It is possible to avoid coating the ends of the first pipe with the first layer of Aerogel, in order to enable them to be welded. The optical fibers for measuring temperature or stress are arranged on the Aerogel. A second layer of Aerogel is molded to coat the first layer and the optical fibers. The optical fiber that has to be provided with the leak detection members is then arranged at the periphery of the second layer of Aerogel. Advantageously, the first pipe of two successive sections is then welded, the weld is coated in Aerogel to guarantee insulation also at this level, then a leak detection member can be formed at the junction of the sections. The detection member is advantageously formed after having completed the welds, which avoids damaging it while welding the first pipes.

Advantageously, the leak detection members are placed at the ends of the sections. Checking them, assembling them and replacing them if necessary are thus greatly facilitated. It is thus possible to envisage easily placing a detection member at the level of each section junction. Such an arrangement is not too optically detrimental, the optical fiber assemblies now having fairly low loss levels. The control of the optical part of a pipe can thus be performed as it is fitted.

The optical fiber provided with its leak detection members can be placed in a groove machined in the top layer of Aerogel. A groove can also be formed by using mold shells of appropriate form.

The gas detection members can, for example, be detectors marketed by the company Kloé under the name K-MZS. Such a detector operates according to the Mach-Zehnder interferometry principle. Such a detection member is produced in the form of an integrated optical component. A branch (sensitive part) is provided with a coating sensitive to a specific gas by absorption. Its refraction index changes with the quantity of said gas that is absorbed. Another branch (reference part) is provided with a coating that is insensitive to the gas, having a stable output optical power.

Another type of detection member, corresponding, for example, to that illustrated in FIG. 3, is formed by an integrated optical component. In this optical component, two Bragg gratings are photo-printed in series. A first Bragg grating is placed in contact with the surrounding gas and has a coating sensitive to a specific gas, as described previously. The wavelength response of the Bragg grating will thus vary with the presence of the gas to be detected. A second Bragg grating is insulated from the gas to be detected, by using, for example, a neutral coating, insensitive to the gas to be detected. Such a configuration makes it possible to use only one optical fiber for leak detection along the pipe.

A Bragg grating is a filter having a wavelength selectivity, formed by the intropipeion of a structure with periodic refraction index into the core of an optical fiber. When a wideband light beam is transmitted in the fiber, the Bragg grating reflects the light corresponding to its wavelength and transmits the remainder of the incident spectrum.

The Bragg grating can be etched in an integrated optical component, according to methods that are known per se. The patent application EP-1 300 704 describes a method of etching a Bragg grating by writing a photosensitive layer on a substrate by means of a laser. The Bragg grating can be written in a material created by the sol gel method. The detection member can be produced in integrated optical component form and be joined to the optical fiber, as detailed in the patent application EP-1 441 018.

Optical fibers can be used to form temperature sensors 8. Such an optical fiber can have Bragg gratings distributed along its length. In practice, the Bragg gratings have a reflection wavelength that depends on their temperature. The shift in wavelength is generally of the order of 10 pm/° C. As for the detection members, each Bragg grating forming a temperature sensor will have a distinctive wavelength that enables the control device to uniquely identify it.

The temperature supplied by a sensor can be used by the control device to correct the measurement by the associated gas detection member.

It is also possible to envisage having the optical fibers 8 used to perform local stress detection functions.

An optical fiber 5 such as that marketed under the reference SMF-28(e) by the company Corning, can be used. This is a single-mode fiber with a particularly low attenuation at approximately 1380 nm. It is a "full-spectrum" fiber that can be used without attenuation peak on the 1260-1600 nanometer spectrum.

The optical fiber can be covered with a coating of acrylate of polyimide to a diameter of 250 µm. A second coating to a diameter of 900 µm can be deposited. A kevlar braid can surround the second coating. A 3 millimeter sheath of polyurethane can cover this braid.

In particular, for methane detection, the coatings and materials whose refraction index is sensitive to the presence of this gas can be based on the use of ZnO or $SnO_2$.

In addition, an optical fiber can be used to perform a gas leak detection continuously over the entire length of the fiber. For this, the shift of the Raman scattering rays of an optical fiber can be detected, the shift being induced by the temperature variations associated with a leak of the gas originating from the first pipe. Compared to the Rayleigh scattering ray, the main source of scattering in the detection member, two Raman rays appear at wavelengths that are respectively less than and greater than the wavelength of the Rayleigh ray. Raman scattering is not elastic, which means that the wavelength of the scattering radiation is different from that of the incident light. After having pulsed a light into the input of the optical fiber, the light scattered toward this fiber input is detected.

This detection can be used to supplement the discrete gas detection described previously in order to increase its reliability.

What is claimed is:

1. A device for transporting a substance, the device comprising:
 a first pipe configured to contain the substance;
 an optical fiber connected to and extending along an axial direction of the pipe;
 several detection members spaced along a length of the optical fiber, each detection member including:
 a sensitive part having a respective reflection spectrum that varies with a presence of the substance which is transported and thus being optically sensitive to the presence of the substance, and
 a reference sensitive part optically insensitive to the presence of the substance;

a control device including:
   a light source positioned and operable to emit light in the respective reflection spectrum of each detection member, and
   a light receiver positioned and operable to detect a light amplitude in the respective reflection spectrum of each sensitive part and the reference sensitive part of each detection member;
an analysis module operable to determine a presence of a leak of the substance from the first pipe based on the light amplitude detected by the light receiver;
a thermal insulation sheath coating the first pipe, the optical fiber passing through the sheath; and
a second pipe surrounding the insulation sheath and forming with the sheath a passage communicating with the sensitive part of each detection member;
wherein a pumping device is operable to cause a flow of inert gas in the passage,
wherein the reference part of each detection member is insulated from direct communication with the flow of the inert gas in the passage.

2. The device for transporting the substance as claimed in claim 1, further comprising:
   a passage communicating with each of the detection members; and
   a first pumping device operable to generate a flow of gas in the passage.

3. The device for transporting the substance as claimed in claim 2, wherein the reference sensitive part has a respective reflection spectrum and is positioned to be insulated from the gas.

4. The device for transporting the substance as claimed in claim 1, further comprising at least one temperature sensor associated with one of the detection members, and both the at least one temperature sensor and the one associated detection member being positioned at a first position along an axis of the first pipe;
   the at least one temperature sensor being connected to the control device, the control device being operable to determine the presence of the substance at the level of a detection member by taking into account the temperature measured by its associated sensor.

5. The device for transporting the substance as claimed in claim 1, further comprising:
   a second optical fiber connected to and extending along the first pipe;
   a device operable to inject a light into the other optical fiber and operable to determine the temperature at the second optical fiber according to a variation of an optical property of the second optical fiber in response to the injected light.

6. The device for transporting the substance as claimed in claim 5, wherein the sensitive part is positioned in the optical fiber and the reference sensitive part is positioned in the second optical fiber.

7. The device for transporting the substance as claimed in claim 1, wherein the detection members comprise a Bragg grating encompassed in a material absorbing a specific gas to be detected.

8. The device for transporting the substance as claimed in claim 7, wherein the material encompassing the Bragg grating absorbs methane.

9. The device for transporting the substance as claimed in claim 1, wherein the analysis module is operable to determine the presence of a leak of the substance according to a shift in wavelength of a light having the amplitude detected by the light receiver.

10. The device for transporting the substance as claimed in claim 1, wherein the sensitive part and the reference sensitive part are positioned in the optical fiber.

11. The device for transporting the substance as claimed in claim 1, wherein the sensitive part of each detection member has a refraction index that changes with the quantity of gas absorbed according to the Mach-Zehnder interferometry principle.

12. A method of detecting a leak of a substance from a pipe transporting the substance, the method comprising the steps:
   injecting, by successive pulses, light into an optical fiber extending along the pipe, the optical fiber including several detection members spaced along a length of the optical fiber,
   wherein each detection member includes a sensitive part that has a reflection spectrum that varies with a presence of the substance and is thus optically sensitive to the presence of the substance, and a reference sensitive part optically insensitive to the presence of the substance, the successive light pulses covering the reflection spectrum of each detection member,
   wherein a thermal insulation sheath coats the first pipe, and the optical fiber passes through the sheath, a second pipe surrounds the insulation sheath and forms with the sheath a passage communicating with the sensitive part of each detection member;
   causing a flow of inert gas in the passage,
   wherein the reference part of each detection member is insulated from direct communication with the flow of the inert gas in the passage;
   detecting the light amplitude in the reflection spectrum of the sensitive part and the reference sensitive part of each detection member; and
   determining the presence of a leak of the substance according to the detected light amplitude.

13. The method of detecting a leak from a gas pipe as claimed in claim 12, wherein the step for determining the presence of a leak of the substance depends on the detection of a shift in the wavelength of the detected light.

* * * * *

UNITED STATES PATENT AND TRADEMARK OFFICE
CERTIFICATE OF CORRECTION

PATENT NO. : 8,418,529 B2  Page 1 of 1
APPLICATION NO. : 12/444459
DATED : April 16, 2013
INVENTOR(S) : Coudray et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this
First Day of September, 2015

Michelle K. Lee
*Director of the United States Patent and Trademark Office*